OR 3,647,275

7 3039D

X 3052 H x 3054 W

United States Ward

[51] 3,647,275

[45] Mar. 7, 1972

[54] IDENTIFICATION SYSTEM USING REFERENCE BEAM CODED HOLOGRAMS

[72] Inventor: John H. Ward, Andover, Mass.

[73] Assignee: Optronics International, Chelmsford, Mass.

[22] Filed: Sept. 9, 1970

[21] Appl. No.: 70,762

[52] U.S. Cl. .......................................350/3.5, 35/2, 40/2.2
[51] Int. Cl. .......................................G02b 27/00
[58] Field of Search .......................................350/3.5; 35/2

[56] References Cited

UNITED STATES PATENTS

| | | | |
|---|---|---|---|
| 3,519,322 | 7/1970 | Brooks et al. | 350/3.5 |
| 3,501,216 | 3/1970 | Kogelnik | 350/3.5 |
| 3,449,577 | 6/1969 | Kogelnik | 350/3.5 |
| 3,552,853 | 1/1971 | Sanders et al. | 350/3.5 |
| 3,484,147 | 12/1969 | Collier | 350/3.5 |
| 3,529,883 | 9/1970 | Wyerker et al. | 350/3.5 |

OTHER PUBLICATIONS

Lohmann, IBM Technical Disclosure Bulletin, Vol. 8, No. 10, March 1966, p. 1402

Burch et al., Nature, Vol. 212, No. 5068, Dec. 17, 1966, pp. 1,347–8

Gates, Jour of Sci. Instr., (Jour. of Physics E), Series 2, Vol. 1, Oct. 1968, pp. 989–994

Leith, " The Hologram Technique and Potential Aplications" June 1965, Chapter 7, Defense Documentation Center Report No. AD 469650

*Primary Examiner*—David Schonberg
*Assistant Examiner*—Ronald J. Stern
*Attorney*—Chittick, Pfund, Birch, Samuels & Gauthier

[57] ABSTRACT

An identification system for identifying persons, articles, documents and the like using a coded hologram which contains the desired identifying indicia in coded holographic form. Encoding of the identifying indicia in the hologram is accomplished by means of a beam scrambler which introduces random path distances in either the reference or object beam during the formation of the hologram. The same or identical beam scrambler is used during reconstruction of the hologram to decode the identifying indicia. The identification system can be used for credit cards and personal access I.D. cards. Typical identifying indicia includes the user's name, signature, and photograph.

12 Claims, 10 Drawing Figures

INVENTOR.
JOHN H. WARD
BY
Chittick, Pfund, Birch, Samuels & Gauthier

INVENTOR.

JOHN H. WARD

BY

Chittick, Pfund, Birch, Samuels & Gauthier

IDENTIFICATION SYSTEM USING REFERENCE BEAM CODED HOLOGRAMS

BACKGROUND OF THE INVENTION

This invention relates to identification systems in general and, more particularly, to an identification system using coded holographic techniques.

In the field of credit cards and I.D. cards, considerable concern has been generated recently over the problems caused by lost, stolen and counterfeit cards. The ubiquitous plastic credit cards, if lost or stolen, can be easily used by an unauthorized person because only the owner's signature has to be duplicated. Signature panels on this type of card can be replaced or altered to eliminate even the need to duplicate the owner's signature. In addition, the embossed information of the owner's name, address, and account number provide sufficient information for producing collateral identification documents, such as, a driver's license.

Various systems have been proposed to code the necessary identifying indicia for credit cards and I.D. cards. In the electromagnetic field, a number of systems based upon magnetic encoding have been described and are well known to those skilled in the art. In the optical field, encoding and decoding techniques are disclosed in the following U.S. Pat. Nos. 3,166,625 and 3,178,993 (optical crystographic device); 2,952,080 (crystographic grid scrambler information); 3,361,511 (fiber optical encoding-decoding); 2,627,199 (image dissecting); 3,125,812 (fiber optic encoding and decoding of signature); 3,455,577 (U.V. or I.R. illumination of fluorescent material); 3,227,474 (optical grid sensor); 3,084,453 (lens intermixing of image sequents); 3,108,383 (diffraction grating); 3,156,051 (random dot card and lens system); 3,379,095 (random background pattern); 3,391,479 (polarization); 3,234,663 (film coding with different wavelength light sources); 3,238,837 (multifiber image encoding and decoding); and, 3,256,767 (fiber optic scanning for encoding and decoding).

Although a number of the optical systems described in the above-mentioned U.S. Patents provide a relatively secure encoding and decoding system, they generally suffer from a variety of practical problems which have to date precluded the adoption of any one of these systems in the credit and I.D. card fields. For instance, the fiber optic scrambler image system affords good image encoding, but for the multiple decoding stations required in a credit card system, the cost of reproducing in quantity the fiber optic decoding bundles imposes too great an economic constraint to be viable. On the other hand, a number of other systems meet the cost requirements for the credit card application, but unfortunately such systems do not provide the requisite level of security.

It is accordingly a general object of the invention to provide a secure identification system for persons, articles, documents and the like.

It is a specific object of the invention to provide an identification system in which no identifying indicia is visible on the credit or I.D. card.

It is another object of the invention to provide an identification system using coded holograms which contain the identifying indicia in coded holographic form.

It is a feature of the identification system that ordinary holographic techniques cannot be employed to reconstruct the coded hologram.

It is another feature of the invention that the identification system uses an optically generated random code for encoding the hologram.

It is still another object of the invention to provide a secure identification system in which the decoding elements can be produced in quantity at a relatively low cost under security-controlled conditions.

It is still another feature of the invention that the identification system is compatible with existing plastic credit cards and that credit cards containing the coded hologram can be produced at a very little cost increase over the cost of present embossed plastic credit cards

BRIEF DESCRIPTION OF THE INVENTION

The objects and features described above are accomplished in the present invention by using a coded hologram which contains the necessary identifying indicia in coded holographic form. The identifying inidicia is encoded in the hologram by means of a beam scrambler which introduces random path distances in either the reference beam or the object beam during the formation of the hologram.

The beam scrambler produces the random path distances by modifying the light beam either during its passage through or reflection from the beam scrambler. In the former case, the beam modification results from random surface deformations on the scrambler or from random variations in the index of refraction of the scrambler. In the latter situation, random surface deformation on the reflecting surface of the scrambler introduce the random path distances in the light beam.

Reconstruction of the coded hologram is achieved by using the same or an identical beam scrambler. In order to obtain both uniform and maximum illumination intensity, the beam scrambler is imaged onto the coded hologram by an afocal lens system during formation and reconstruction of the reference beam coded hologram.

The objects and features of the identification system of the present invention will best be understood from a detailed description of a preferred embodiment thereof, selected for purposes of illustration and shown in the accompanying drawings, in which.

Figure 1:
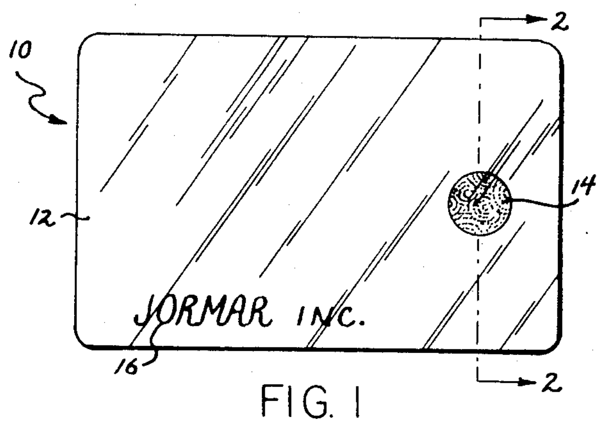
FIG. 1 is a plan view of an identification element, such as a credit card, having a coded hologram containing the identification indicia.
Figure 2:
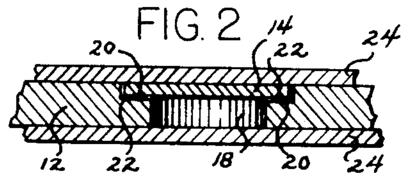
FIG. 2 is a view in cross section taken along line 2—2 in FIG. 1 showing a coded hologram mounted on the credit card and protected by a transparent laminated overlay.

Turning now to the drawings and particularly to FIGURES 1 and 2 thereof, there is shown in plan view and cross section respectively, an identification element indicated generally by the reference numeral 10. The identification element comprises a support member 12 and a coded hologram 14 which contains in coded holographic form identifying indicia, such as a person's name, address, signature, and photograph. Since the identifying indicia is in holographic form, it cannot be ascertained by merely inspecting the card. The coded hologram 14 and identifying indicia are decoded by methods described below to provide a positive identification of the bearer at the point of use.

The identification element 10 broadly covers such diverse elements as a standard credit card, an I.D. card for personnel access, various types of documents, articles of property and the like. It will be appreciated that the identification system of the present invention can be used to provide an identification element for any type of tangible member to which a coded hologram can be affixed.

The term "identifying indicia" as used herein broadly covers any type of identifying information. For instance, in the case of a credit card, generally the minimum information comprises the owner's name, signature, and preferably his photograph. In addition, further information with regard to the owner's address, account number, credit limits, number of cards, etc., can be included as part of the identifying indicia coded into the hologram. For articles of personal property, such as automobiles, the identifying indicia can include engine and chassis serial numbers, model numbers and manufacturing date.

It will be appreciated from the preceding description of the identification element 10, that the element does not have to have any visibly intelligible information on the element itself. However, in the case of a credit card, it may be desirable to provide at least some visible information with respect to the store or other organization which issued the credit card. Looking at FIG. 1, the issuing store's name appears in printed form on the face of the identification element and is identified by the reference numeral 16.

Various types of mounting systems can be employed to affix the coded hologram 14 to the support member 12 of the identification element. One such method is illustrated in FIG. 2 wherein the support member 12 has a dual diameter aperture 18 which broadens out into hologram receiving shoulders 20. The coded hologram 14 is secured to the aperture shoulders 20 by means of a suitable adhesive 22. Preferably, two transparent protective layers 24 are laminated to the support member 12 to seal the hologram 14 and protect the hologram against abrasion and environmental damage. The mounting arrangement illustrated in FIG. 2 is particularly suitable for holograms which are reconstructed by transmitting light through the hologram. However, if the hologram is reconstructed by reflecting light off the hologram, the coded hologram 14 can be mounted directly on the support member 12 as illustrated in FIG. 3.

Figure 3:
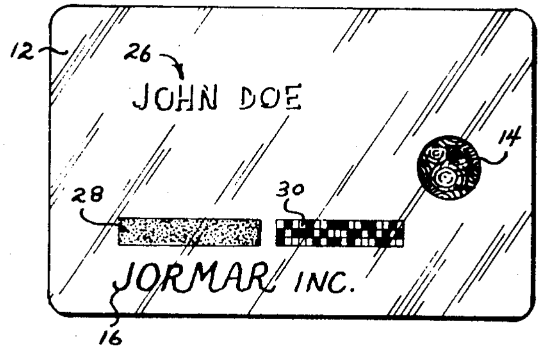
FIG. 3 is a plan view of another identification element containing visible information and other encoding data such as a magnetic stripe and an optical pattern.

The identification element shown in FIG. 3 depicts a number of other variations with respect to the visibly intelligible information appearing on the support member as well as other forms of informational coding. Looking at FIG. 3, the support member 12 comprises a typical plastic credit card which has the owner's name 26 embossed therein.

In addition, the credit card may contain a magnetic stripe 28 for encoding in magnetic form other identifying information. A similar encoding system using an optical code pattern 30 also may be included on the card. The magnetic and optical encoding techniques are well known to those in the credit card card art and need not be described in detail.

The hologram used in the identification system of the present invention, is coded to prevent simple reconstruction of the hologram by well known holographic techniques with the concomitant divulgence of the identifying indicia. A code plate or beam scrambler is employed to encode the identifying indicia in the hologram. The same or an identical beam scrambler is used during the reconstruction process to form the holographic image of the identifying indicia. In order to provide maximum security for the identification system, the beam scrambler scrambles the identifying indicia image in a random manner by purely optical means. The present invention does not use the less secure computer-generated coding pattern of other identification systems.

Figure 4:
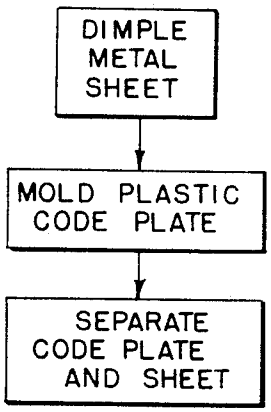
FIG. 4 is a flow block diagram illustrating the manufacture of a beam scrambler or code plate for encoding the hologram.
Figure 5:
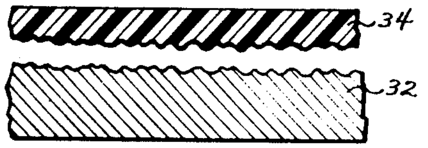
FIG. 5 is a view in cross section showing a beam scrambler mold and the molded beam scrambler.

One method of making the beam scrambler with a random code is illustrated in flow block diagram form in FIG. 4 and in cross section in FIG. 5. A metal sheet 32 such as aluminum, is dimpled with an overall pattern of dimples. The dimples or depressions in the aluminum plate can be formed by hand peening the plate with a ball peen hammer. Alternatively, steel balls can be fired at the plate with a random scatter gun. After forming the dimpled metal sheet, the random surface deformation pattern is molded into a plastic code plate or beam scrambler 34. When the plastic has cooled sufficiently the metal plate 32 and code plate or beam scrambler 34 are separated as shown in FIG. 5.

FIGS. 6–10 illustrate in diagrammatic form various systems for forming and reconstructing the coded hologram of the present invention. Before discussing in detail the systems shown in FIG. 6–10, reference should be made to the earlier work in the field of coded holograms. Attention is directed to the following publications. "Hologram Imagery Through Diffusing Media," Letters to the Editor, Leith and Upatneiks, Journal of the Optical Society of America, Vol. 56, No. 4, Apr. 1966 at p. 523; "Resolution-Retrieving Compensation of Source Effects by Correlative Resolution in High-Resolution Holography," Stroke, et al., Physics Letters, Vol. 18, No. 3, Sept. 1, 1965 at pages 274–275; and, "Holography" by DeVelis and Reynolds, Addison Wesley Publishing Company, Inc., Reading, Massachusetts, 1967.

Figure 6:
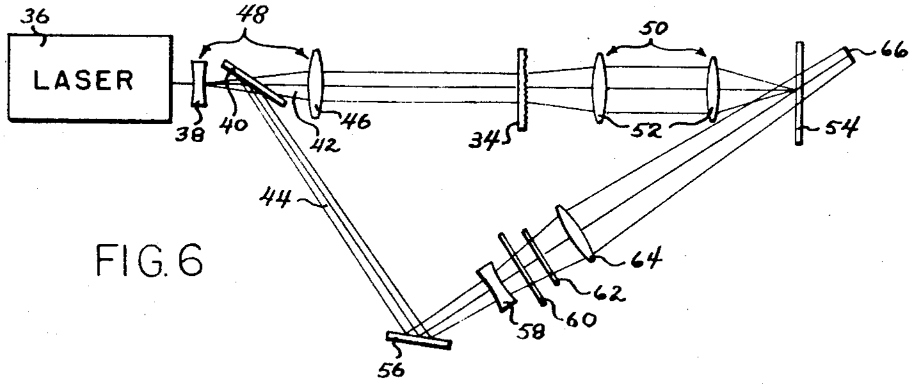
FIG. 6 is a diagrammatic view illustrating the formation of a coded hologram in which the reference beam is scrambled.
Figure 8:
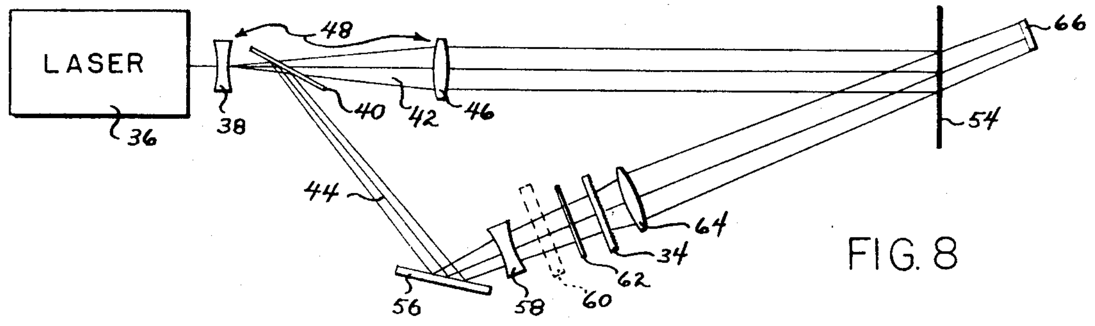
FIG. 8 is a diagrammatic view showing the formation of a coded hologram in which the object beam is scrambled.

The formation of the coded hologram 14 can be accomplished by introducing the coding pattern or beam scrambling in either the reference beam, as shown in FIG. 6, or the object beam as shown in FIG. 8. Looking at FIG. 6, a source of coherent light is provided by a conventional laser 36. The light beam emitted by laser 36 is spread by a negative lens 38 before striking beam splitter 40. The beam splitter amplitude divides the beam of coherent light into a reference beam 42 and an object beam 44. The reference beam 42 passes through a positive lens 46 which cooperates with negative lens 38 to form a collimator 48 for the reference beam 42. The previously mentioned beam scrambler 34 is positioned to intercept the reference beam 42 and to introduce therein random path distances. The beam scrambler 34 is imaged by lens system 50 comprising two identical lenses 52, onto a photosensitive member 54. The identical lenses 52 are spaced apart by a distance equal to 2f to provide an afocal lens system.

The object beam 44 is directed to and reflected from a mirror 56. The reflected object beam passes through a negative lens 58 onto an optional diffusing element 60. The diffused light exiting from diffuser 60 illuminates an object or target 62 containing the previously mentioned identifying indicia. *(The object 62 can be either transparent or opaque and may, if desired, be self-diffusing e.g., a relatively rough-surfaced paper.) A positive lens 64 images the object 62 through the photosensitive member 54 forming an image 66 of the object behind the photosensitive member. The object beam has sufficient coherency with respect to the reference beam to form a holographic interference pattern on the photosensitive member 54.

It will be appreciated and understood by those skilled in the holographic art, that the optical path distances for the reference and object beams must be substantially the same. (Ignoring the random path distances introduced by the beam scrambler 34 to produce the hologram 54.) For purposes of clarity, the optical path distance compensating "dogleg" in the reference beam has been omitted from FIGS. 6 and 8.

The diagrammatic system illustrated in FIG. 6 shows the use of a transparent beam scrambler which introduces random path distances in the reference beam. The random path distances are produced by the random surface deformations on the beam scrambler 34. Alternatively, in the case of a light-transmitting beam scrambler, the random path distances can be produced by random variation in the index refraction of the beam scrambler. This type of beam scrambler can be produced by first imaging a photosensitive member with a random intensity light pattern, then developing the exposed image and finally bleaching the image in accordance with well-known techniques. It will also be appreciated that the random path distances can be introduced in the reference beam by reflecting the beam off of a beam scrambler which has random surface deformations in its reflecting surface e.g., metal plate 32.

Figure 7:
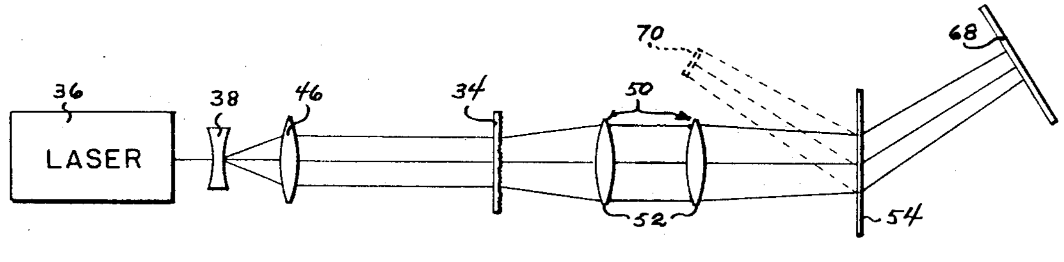
FIG. 7 is a diagrammatic view illustrating the reconstruction of the hologram formed by the method shown in FIG. 6.

The reconstruction of the coded hologram produced by the system illustrated in FIG. 6 is depicted in FIG 7 with the same reference numerals being used to identify like components in both FIGS. 6 and 7. The hologram 54 is positioned at the focused image of the beam scrambler 34 produced by the afocal lens system 50. The hologram is then aligned to form a holographic image on screen 68. If the hologram 54 is coated with a light-reflecting material, the holographic image will be formed at a position indicated by the reference numeral 70.

The reconstructed holographic image containing the identifying indicia can be used in a variety of ways. For credit card applications where the reconstructed image would normally be formed at the point of purchase, the system shown in FIG. 7 can be used with screen member 68 providing a visual image of the reconstructed holographic image. In data-processing applications, the screen 68 can comprise a matrix of photodetectors which convert the reconstructed holographic image into an electrical signal for subsequent processing by conventional data-processing equipment.

It has been mentioned already in connection with the system described in FIG. 6 that an optional diffuser 60 can be used to diffuse the object beam which illuminates the object 62. The purpose of using such a diffuser is to prevent the possible reconstruction of the beam scrambler on code plate 34 by using the object beam as a reference beam. In other words, the beam scrambler 34 is hidden by the use of the diffuser 60. This arrangement provides a maximum security for the coded hologram identification system.

The diffuser 60 can be formed from a number of suitable materials, such as for example, ground glass. If ground glass is used, it is desirable to partially reduce the light-scattering property of the ground glass by coating the ground glass surface with a thin film of a light-transmitting wax or white petroleum jelly, such as, the jelly sold under the trademark "Vaseline."

The coded hologram used in the identification system of the present invention can be formed as mentioned above by coding the object beam instead of the reference beam. This method of forming the hologram is illustrated in FIG. 8 where again the same reference numerals have been used to identify like components. Looking at FIG. 8, the negative and positive lenses 38 and 46, respectively, form a collimator 48 which projects a beam of collimated coherent light from laser 36 onto the photosensitive member 54. Preferably, the object beam 44 is diffused by the optional diffuser 60 before illuminating the identifying indicia containing object 62. The object beam coding system has been shown in FIG. 8 with a light-transmitting beam scrambler 34. However, it should be understood that the beam scrambler 34 can be reflecting surface which has random surface deformations such as metal plate 32. Likewise, it will be appreciated that the length of the optical paths for the reference and object beams (ignoring the random path distances introduced by the beam scrambler) are the same to maintain the coherency required for the formation of the hologram on the photosensitive member 54.

Figure 9:
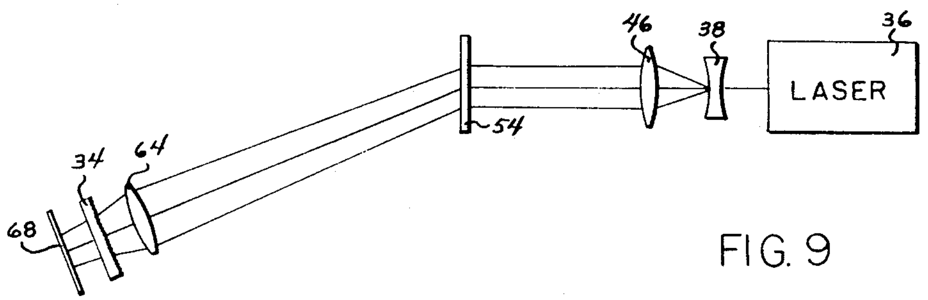
FIG. 9 is another diagrammatic view depicting the reconstruction of the coded hologram formed by the method illustrated in FIG. 8; and, FIG. 10 is a diagrammatic view of an alternative illumination system using an incoherent light source.

FIG. 9 illustrates the readout or reconstruction system for the object beam coded hologram formed by the system illustrated in diagrammatic form in FIG. 8. Again, similar reference numerals have been used to identify like components. Looking at FIGS. 8 and 9, it can be seen that the distance between the hologram 14 and the image lens 64 is the same in both illustrations. Similarly, the distance between the imaging lens 64 and beam scrambler 34 in the hologram formation system of FIG. 8 is the same as the distance between the imaging lens 64 and the beam scrambler 34 in the reconstruction system shown in FIG. 9. A corresponding equality of distances is also found between the beam scrambler 34 and object 62 and the beam scrambler 34 and viewing screen or photodetector matrix 68.

Figure 10:
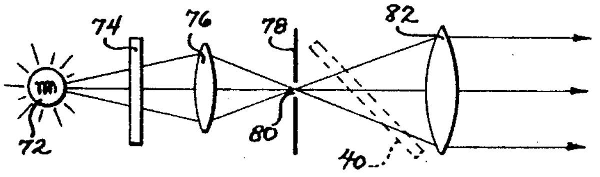

In the holograph-forming and reconstruction systems illustrated in FIGS 6–9, a laser 36 has been employed as the source of light. It should be understood that the term "light" includes infrared, visible and ultraviolet radiation. It is, of course, also possible to use a source of incoherent light 72 as shown in FIG. 10. The incoherent light from incandescent light 72 is filtered to a single wavelength by filter 74. A positive lens 76 concentrates the filtered light to a point source on light baffle 78. The baffle 78 contains a pinhole 80 which acts as a point source illumination for positive lens 82. The point source illumination exiting from pinhole 80 can be amplitude divided into the reference and object beams by positioning the beam splitter 40 between the light baffle 78 and positive lens 82. Alternatively, the beam splitter 40 can be positioned downstream from the positive lens 82. The single wavelength light exiting through pinhole 80 has sufficient coherency to permit the formation of a hologram by any one of the systems depicted in FIGS. 6–9. Therefore, the incoherent illumination system shown in FIG. 10 can be substituted for the laser light system shown in FIGS. 6–9.

Having described in detail a preferred embodiment of my invention, it will be appreciated that the coded hologram identification system has wide applications and can be modified without departing from the scope of the following claims.

What I claim and desire to secure by Letters Patent of the United States is:

1. A method of making a coded hologram comprising the steps of:

a. producing a beam of at least partially coherent light;

2. amplitude dividing said light beam into separate angularly displaced reference and object light beams;

3. passing only said reference light beam through a beam scrambler to introduce random path distances in said reference light beam;

4. positioning a photosensitive member to intercept at least a portion of the scrambled reference beam light;

5. imaging said beam scrambler onto said photosensitive member;

6. illuminating an object with the object light beam; and,

7. directing at least a portion of the object-modified light onto the photosensitive member, said object-modified light being sufficiently coherent with respect to the reference light beam to produce an interference pattern on said photosensitive member.

2. The method of claim 1 wherein said object light beam is first diffused by a diffuser different from said reference beam scrambler and then said object is illuminated by at least some of the diffused object beam light.

3. The method of claim 1 wherein said beam scrambler is imaged on said photosensitive member by an afocal lens system.

4. The method of claim 1 wherein said object itself diffuses said object light beam.

5. The method of claim 1 wherein said reference light beam is passed through a beam scrambler which has random surface deformations.

6. The method of claim 5 wherein said beam scrambler random surface deformations are formed by molding said beam scrambler in a mold having complementary random surface deformations.

7. The method of claim 1 wherein said reference light beam is reflected from a beam scrambler which has random surface deformations on a reflecting surface thereof.

8. The method of claim 1 wherein said reference light beam is passed through a beam scrambler which has random variations in its index of refraction.

9. The method of claim 2 wherein said object is imaged at a location other than the location of said photosensitive member.

10. The method of claim 9 wherein the object image is located behind said photosensitive member.

11. A method of reconstructing a coded hologram that was encoded by a beam scrambler which introduced random path distances only in the reference beam and which was imaged upon the hologram during the formation thereof, said hologram reconstruction comprising the steps of:

1. producing a beam of at least partially coherent light;

2. introducing the same random path distances in said reference light beam by using the same or an identical beam scrambler to that which was used in forming the hologram;

3. forming an image of the beam scrambler;

4. positioning the coded hologram at the focused image of said beam scrambler; and thereafter,

5. aligning the coded hologram to produce a holographic image.

12. The method of claim 11 wherein the image of said beam scrambler is formed by an afocal lens system.

* * * * *